(12) United States Patent
Jeong et al.

(10) Patent No.: US 8,878,546 B2
(45) Date of Patent: Nov. 4, 2014

(54) APPARATUS AND METHOD FOR QUICKLY DETERMINING FAULT IN ELECTRIC POWER SYSTEM

(75) Inventors: Young Woo Jeong, Cheongju (KR); Hyun Wook Lee, Cheongju (KR)

(73) Assignee: LSIS Co., Ltd., Anyang-Si, Gyeonggi-Do (KR)

( * ) Notice: Subject to any disclaimer, the term of this patent is extended or adjusted under 35 U.S.C. 154(b) by 301 days.

(21) Appl. No.: 13/218,323

(22) Filed: Aug. 25, 2011

(65) Prior Publication Data
US 2012/0056637 A1 Mar. 8, 2012

(30) Foreign Application Priority Data

Sep. 7, 2010 (KR) .................. 10-2010-0087616

(51) Int. Cl.
- H01H 31/02 (2006.01)
- G01R 31/08 (2006.01)
- G01R 31/00 (2006.01)
- H02H 3/44 (2006.01)
- H02H 1/00 (2006.01)

(52) U.S. Cl.
CPC ............... *H02H 3/44* (2013.01); *H02H 1/0023* (2013.01); *H02H 1/0092* (2013.01)
USPC ............................ 324/555; 324/536; 324/500

(58) Field of Classification Search
None
See application file for complete search history.

(56) References Cited

U.S. PATENT DOCUMENTS

| 5,914,663 A * | 6/1999 | Whitehead .................... 340/638 |
| 7,580,232 B2 * | 8/2009 | Caggiano et al. ................. 361/5 |
| 2010/0214724 A1 * | 8/2010 | Dahl et al. .................... 361/621 |

FOREIGN PATENT DOCUMENTS

CN 2342507 10/1999

OTHER PUBLICATIONS

The State Intellectual Property Office of the People's Republic of China Application Serial No. 201110271302.9, Office Action dated Dec. 26, 2013, 5 pages.

* cited by examiner

*Primary Examiner* — Melissa Koval
*Assistant Examiner* — Courtney McDonnough
(74) *Attorney, Agent, or Firm* — Lee, Hong, Degerman, Kang & Waimey

(57) ABSTRACT

An apparatus for quickly determining a fault in an electric power system includes a current transformer, a current determination unit and a fault determination unit. The current transformer detects current supplied to the electric power system and outputs a current detection voltage. The current determination unit respectively compares the current detection voltage, the first-order differential voltage of the current detection voltage and the second-order differential voltage of the current detection voltage with predetermined first, second and third reference voltages. The fault determination unit determines whether a fault occurs based on the compared result of the current determination unit and generates a trip signal when it is determined that the fault has occurred.

15 Claims, 7 Drawing Sheets

APPARATUS AND METHOD FOR QUICKLY DETERMINING FAULT IN ELECTRIC POWER SYSTEM

CROSS-REFERENCE TO RELATED APPLICATION

Pursuant to 35 U.S.C. §119(a), this application claims the benefit of earlier filing date and right of priority to Korean Patent Application No. 10-2010-0087616, filed Sep. 7, 2010, the contents of which are hereby incorporated by reference herein in its entirety.

BACKGROUND OF THE INVENTION

1. Field of the Invention

An aspect of the present invention relates to an apparatus and a method for quickly determining occurrence of a short fault or a ground fault in an electric power system. More particularly, an aspect of the present invention relates to an apparatus and a method for determining whether a fault occurs in a relay used in an electric power system, in which when a fault current flows due to sudden occurrence of a short fault or a ground fault in the electric power system in a normal load state or non-load state, the fault current is quickly sensed to protect the electric power system.

2. Description of the Related Art

Various kinds of relays are used to protect a system when a short current or an over-current occurs due to a short fault or a ground fault, in addition to normal use conditions of a load, between consumers and power generation, transmission and distribution providers or in a unit power system, after electricity is used as energy.

An over current relay (OCR) is known as a representative relay. In addition, relays having several protection elements including voltage, frequency and differentiation are developed and widely used as digital relays via analog relays.

A protection element of short current or over-current generally determines occurrence of a fault using the root mean square (RMS) value of a fault current for 0.5 to 1 cycle so as to exactly determine the fault and prevent malfunction of a system. Therefore, a general relay has a trip output time of about 30 ms when it determines occurrence of a fault and then generates a trip signal.

However, the trip output time is a slightly long time to protect the system in a specific situation. Although the general relay has a speed sufficient to protect the system in current electronic and digital technologies, much time is still taken for the relay to determine the occurrence of the fault.

Particularly, since it is difficult to determine an arc fault that occurs in the inside of a switchgear or an electric power device within the trip output time of the general relay, system, device and people damages cannot be avoid.

Further, the fault determination time in the general relay cannot satisfy a short determination time necessary for relays that require a high-speed trip in a large fault current.

SUMMARY OF THE INVENTION

Embodiments of the present invention provide an apparatus and a method for quickly determining the presence of occurrence of a fault in an electric power system.

Embodiments of the present invention also provide an apparatus and a method for quickly determining a fault in an electric power system, which can prevent system, device and people damages by determining occurrence of an arc fault in a switchgear or an electric power device within a time of 0.125 to 0.25 cycle or less, without an input waiting time having an RMS value of 0.5 to 1 cycle, in a relay that requires a high-speed determination time.

It is to be understood that technical problems to be solved by the present invention are not limited to the aforementioned technical problems and other technical problems which are not mentioned will be apparent from the following description to the person with an ordinary skill in the art to which the present invention pertains.

According to an aspect of the present invention, there is provided an apparatus for quickly determining a fault in an electric power system, the apparatus including: a current transformer configured to detect current supplied to the electric power system and output a current detection voltage; a current determination unit configured to respectively compare the current detection voltage, a first-order differential voltage of the current detection voltage and a second-order differential voltage of the current detection voltage with predetermined first, second and third reference voltages; and a fault determination unit configured to determine whether a fault occurs based on the compared result of the current determination unit and generate a trip signal when it is determined that the fault has occurred.

In some exemplary embodiments, the current determination unit may include a first comparator configured to compare the current detection voltage with the predetermined first reference voltage; a first differentiator configured to generate the first-order differential voltage by performing a first-order differentiation of the current detection voltage; a second comparator configured to compare the first-order differential voltage of the first differentiator with the predetermined second reference voltage; a second differentiator configured to generate the second-order differential voltage obtained by performing a differentiation of the first-order differential voltage of the first differentiator; and a third comparator configured to compare the second-order differential voltage of the second differentiator with the predetermined third reference voltage.

When the current detection voltage is the predetermined first reference voltage or more, and the first-order differential voltage is the predetermined second reference voltage or more, the fault determination unit may determine that the fault has occurred and generate a trip signal.

When the current detection voltage is the predetermined first reference voltage or more, and the second-order differential voltage is the predetermined third reference voltage or more, the fault determination unit may determine that the fault has occurred and generate a trip signal.

In some exemplary embodiments, the apparatus may further include an optical sensor provided to a portion at which light is generated in the occurrence of an arc fault, the optical sensor detecting the light and outputting an optical signal; and an optical signal determination unit configured to compare an optical detection voltage converted from the optical signal with a predetermined fourth reference voltage and output the compared result to the fault determination unit. The fault determination unit may determine whether a fault occurs based on the compared result of the current determination unit and the optical signal determination unit, and generate a trip signal when it is determined that the fault has occurred.

In some exemplary embodiments, the optical sensor may be a plurality of point optical sensors.

In some exemplary embodiments, the optical sensor may be a loop optical sensor configured as an optical cable of which jacket portion is formed of a transparent material.

In some exemplary embodiments, the optical signal determination unit may include an electric signal converter configured to convert the optical signal of the optical sensor into an optical detection voltage that is an electrical signal; and a fourth comparator configured to compare the optical detection voltage outputted from the electric signal converter with the predetermined fourth reference voltage.

When the optical detection voltage of the optical sensor is the predetermined fourth voltage or more, and the current detection voltage is the predetermined first reference voltage or more, the fault determination unit may determine that the fault has occurred and generate a trip signal.

When the optical detection voltage is the predetermined fourth voltage or more, the current detection voltage is the predetermined first reference voltage or more, and the first-order differential voltage of the current detection voltage is the predetermined second reference voltage or more, the fault determination unit may determine that the fault has occurred and generate a trip signal.

When the optical detection voltage is the predetermined fourth voltage or more, the current detection voltage is the predetermined first reference voltage or more, and the second-order differential voltage of the current detection voltage is the predetermined third reference voltage or more, the fault determination unit may determine that the fault has occurred and generate a trip signal.

According to another aspect of the present invention, there is provided a method for quickly determining a fault in an electric power system, the method including the steps of: (a) receiving a current detection voltage inputted based on current supplied to the electric power system; (b) receiving an optical signal of an optical sensor provided to a portion at which light is generated in the occurrence of an arc fault, and generating an optical detection voltage from the optical signal; (c) generating a first-order differential voltage by performing a differentiation of the current detection voltage, and generating a second-order differential voltage by performing a differentiation of the first-order differential voltage; (d) respectively comparing the current detection voltage, the first-order differential voltage, the second-order differential voltage and the optical detection voltage with predetermined first, second, third and fourth reference voltages; and (e) determining whether a fault occurs based on the compared result of the step (d), and generating a trip signal when it is determined that the fault has occurred.

When the current detection voltage is the predetermined first reference voltage or more, and the first-order differential voltage is the predetermined second reference voltage or more, or when the current detection voltage is the predetermined first reference voltage or more, and the second-order differential voltage is the predetermined third reference voltage or more, the step (e) may determine that the fault has occurred and generate a trip signal.

When the optical detection voltage is the predetermined fourth reference voltage or more, the current detection voltage is the predetermined first reference voltage or more, and the first-order differential voltage is the predetermined second reference voltage or more, the step (e) may determine that the fault has occurred and generate a trip signal.

When the optical detection voltage is the predetermined fourth reference voltage or more, the current detection voltage is the predetermined first reference voltage or more, and the second-order differential voltage is the predetermined third reference voltage or more, the step (e) may determine that the fault has occurred and generate a trip signal.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

The present invention is described more fully hereinafter with reference to the accompanying drawings, in which embodiments of the present invention are shown. This present invention may, however, be embodied in many different forms and should not be construed as limited to the embodiments set forth herein. Rather, these embodiments are provided so that this disclosure is thorough, and will fully convey the scope of the present invention to those skilled in the art.

Figure 1:
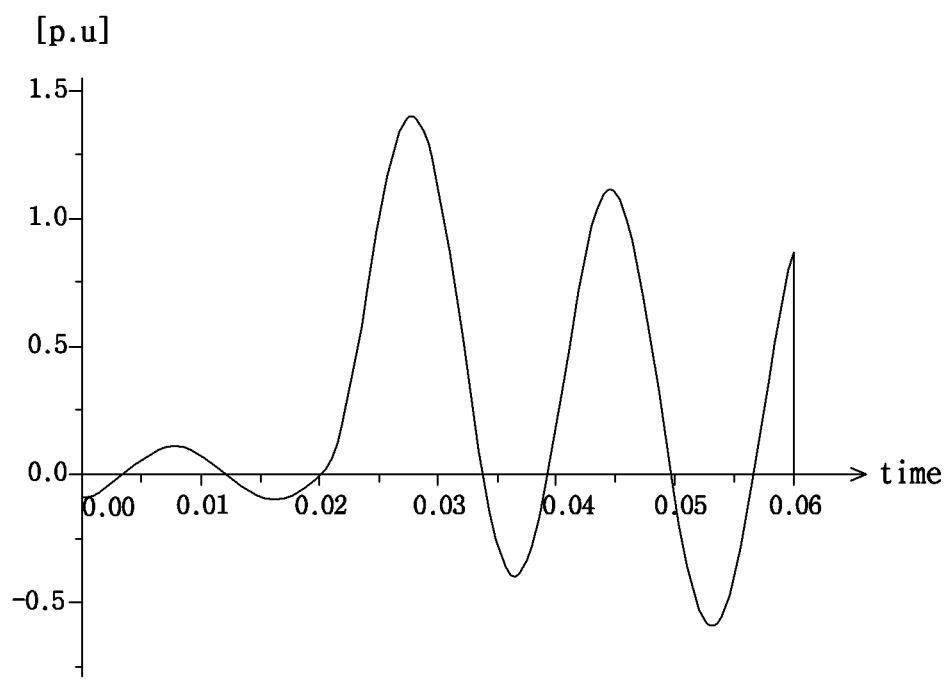
FIGS. 1 and 2 are graphs showing examples of a fault current flowing when a short fault or a ground fault occurs.
Figure 2:
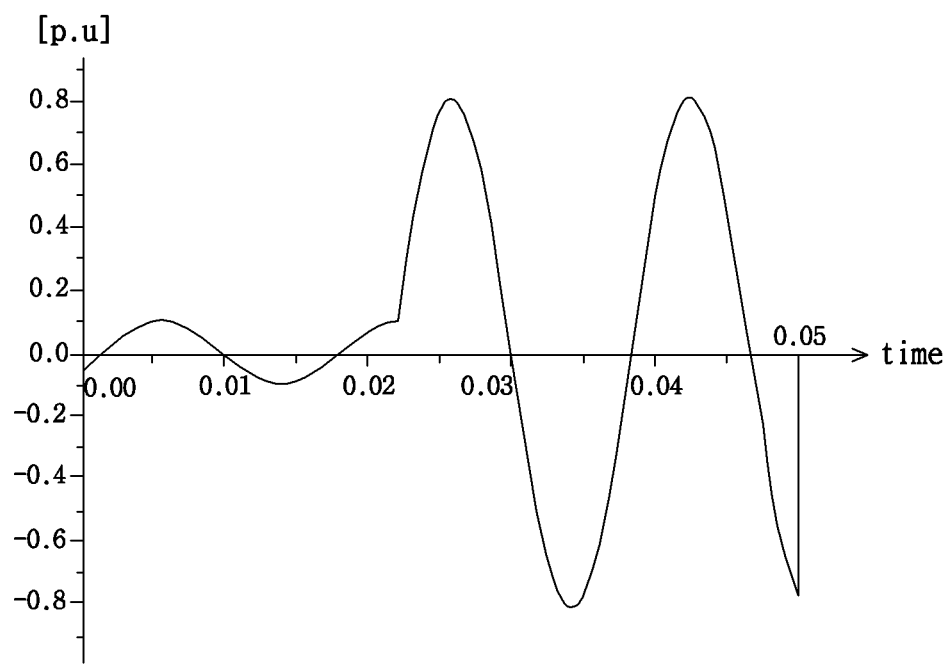

In a case a short fault or a ground fault occurs in an electric power system, a fault current flows as shown in FIG. 1 or 2.

In a case the fault occurs in the vicinity of a voltage of a phase of $n\pi$ (here, n is 0, 1, 2, ... ), a DC component is added to a fault current, so that the fault current has an asymmetric waveform as shown in FIG. 1. In a case the fault occurs at the voltage of the phase of $n\pi$, the largest DC component is added to the fault current. As the occurrence time of the fault shifts to the vicinity of a peak voltage, i.e., a voltage of a phase of $n\pi/2$ (here, n is 1, 2, 3, ... ), the DC component decreases, so that the fault current has a symmetric waveform as shown in FIG. 2.

Generally, in most methods for determining a fault in a short current and over-current protection element used in a relay, the relay receives the root mean square (RMS) value of a fault current for 0.5 to 1 cycle. Then, in a case the RMS value is greater than a predetermined reference value, the relay determines that the fault has occurred and generates a trip signal.

Here, the RMS value corresponds to the area of the waveform in the graph shown in FIG. 1 or 2.

The calculation for determining occurrence of the fault may be performed using an analog method. Recently, the calculation has been frequently implemented using a digital electronic circuit.

Generally, relays for protecting short current and over-current determine the presence of occurrence of a fault by receiving the RMS value of a fault current for 0.5 to 1 cycle, and thus the reliability for the determination of the fault is very high. However, although the relays operate at a high speed thanks to hardware with a very excellent performance, much time is taken to determine the occurrence of the fault by receiving the RMS value. The relays including relay elements usually have a trip signal output time of about 30 ms.

Therefore, it is impossible to apply the methods to an arc fault in a switchgear or an electric power device or a relay that requires a very high-speed operation.

Particularly, if fault energy occurs as the form of an arc together with a very high fault current in the arc fault, high pressure and high heat, accompanied with the fault energy, reach a maximum value for 10 to 15 ms. Therefore, a built-in electric power device and an external case are damaged, and people damage may be caused when people exist in the vicinity of the device.

When considering an operation time of about 30 ms required in a general over-current protection element and an operation time of a circuit breaker, the operation time is too late to prevent system, electric device and people damages.

Figure 3:
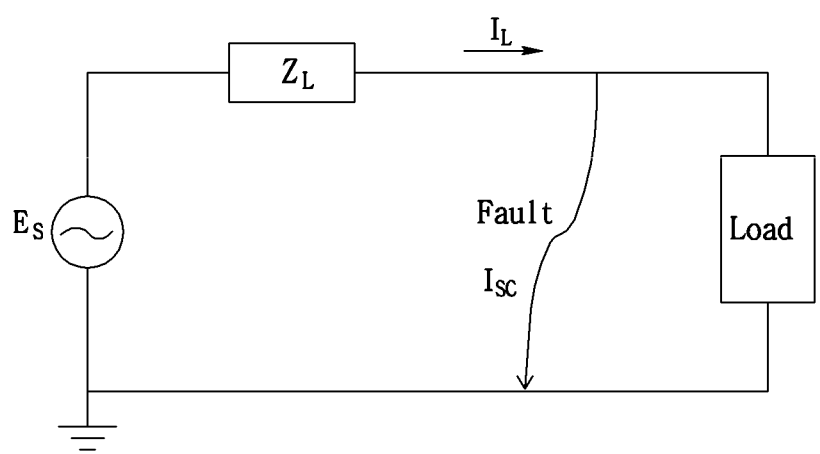
FIG. 3 is a diagram showing a simplified AC power system or a simplified electric circuit.

An AC power system or an electric circuit may be generally simplified as shown in FIG. 3. Load current $I_L$ determined by line impedance $Z_L$, impedance of a load Load and power voltage $E_S$ of the system flows under normal load conditions.

If a short fault or a ground fault Fault occurs at an arbitrary time, a very high fault current $I_{SC}$ limited by only the line impedance $I_L$ flows. In a case the short fault or ground fault occurs at a voltage of a phase of $n\pi$, an asymmetric sinusoidal fault current flows as shown in FIG. 1. In a case the short fault or ground fault occurs at a voltage of a phase of $n\pi/2$, a symmetric sinusoidal fault current flows as shown in FIG. 2. In a case the short fault or ground fault occurs at a voltage of a phase between $n\pi$ and $n\pi/2$, an asymmetric fault current containing a DC component attenuated in proportion to the phase angle.

In a case an arc fault occurs, an arc reaches a maximum value within about 10 to 15 ms. Therefore, damage caused by the arc fault cannot be removed by the general relay for protecting short current and over-current.

Recently, relays having arc protection elements have been developed to protect devices and people from an arc fault. These relays determine the presence of occurrence of an arc fault within 0.5 to 15 ms and then generate a trip signal.

In order to determine occurrence of a fault at a high speed, reliability is necessarily maintained as well as a quick determination time.

Accordingly, in the present invention, the occurrence of the fault is not determined using an RMS value but determined using an instantaneous value of a current waveform. The occurrence of the fault is determined at a high speed by processing information based on the current waveform. In the present invention, elements for determining occurrence of a fault are as follows. In an apparatus for quickly determining a fault in an electric power system according to the present invention, the instantaneous value of current, the differential value of the instantaneous value of the current and the instantaneous value of an optical signal are detected as voltages, and the detected voltages are used to determine the occurrence of the fault.

1. Instantaneous value of fault current: i(t)
2. First-order differential value of instantaneous value of fault current:

$$\frac{di(t)}{dt}$$

3. Second-order differential value of instantaneous value of fault current:

$$\frac{di^2(t)}{dt^2}$$

4. Instantaneous value of optical signal detected by optical sensor in arc fault: L(t)

In the present invention, a highly reliable determination of the fault can be performed at a very high speed by setting appropriate reference values (i.e., reference voltages) for the respective four elements described above and performing logical sum and multiply operations of the four elements.

Since the inductance component included in the electric power system has a characteristic of preventing the sudden change and discontinuity of current, a predetermined time is taken to increase the current from the value of normal current to the peak value of a fault current when a ground fault occurs.

Therefore, if only the instantaneous value i(t) of the fault current is compared with the predetermined reference value so as to determine occurrence of a fault at a high speed for 0.125 cycle or less, the stability of the determination of the fault is low, and much time is taken to determine the occurrence of the fault.

In order to solve such a problem, there is a proposed a method of maintaining high reliability and reducing the time for determining the fault by using $$\frac{di(t)}{dt}$$

that is a first-order differential value obtaining by performing a first-order differentiation of the instantaneous value of the fault current together with the instantaneous value of the fault current.

Figure 4:
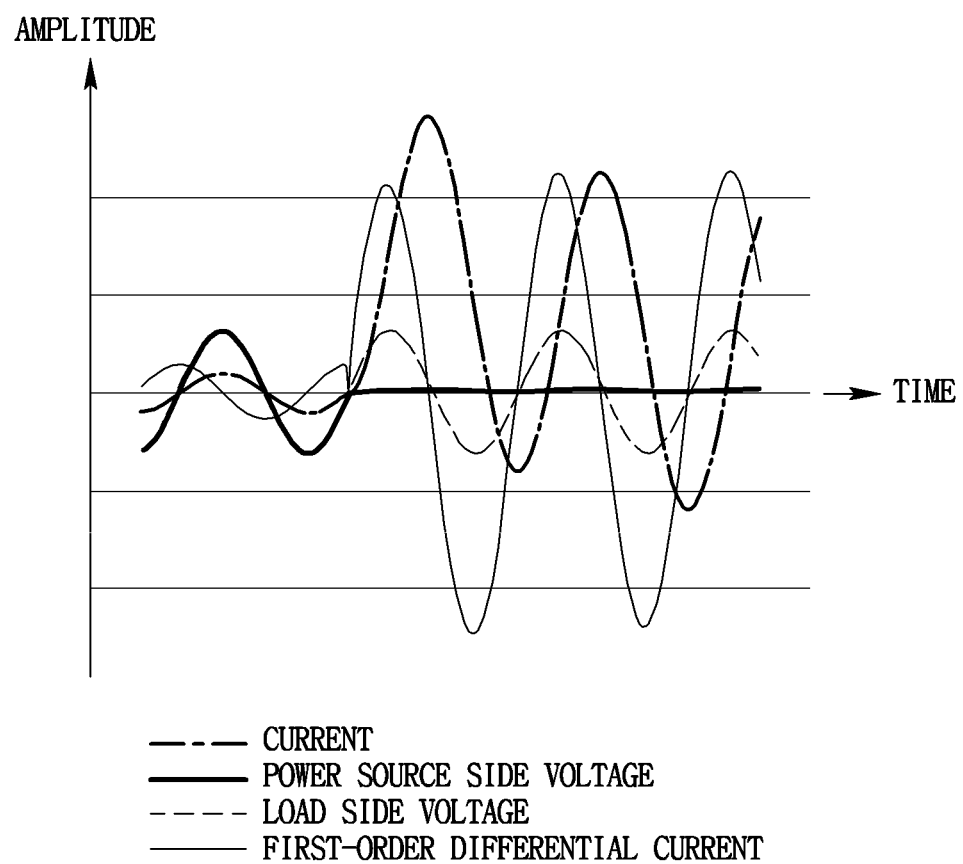
FIG. 4 is a graph showing a symmetric sinusoidal fault current flowing when a fault occurs at a voltage of a phase of $n\pi/2$.
Figure 5:
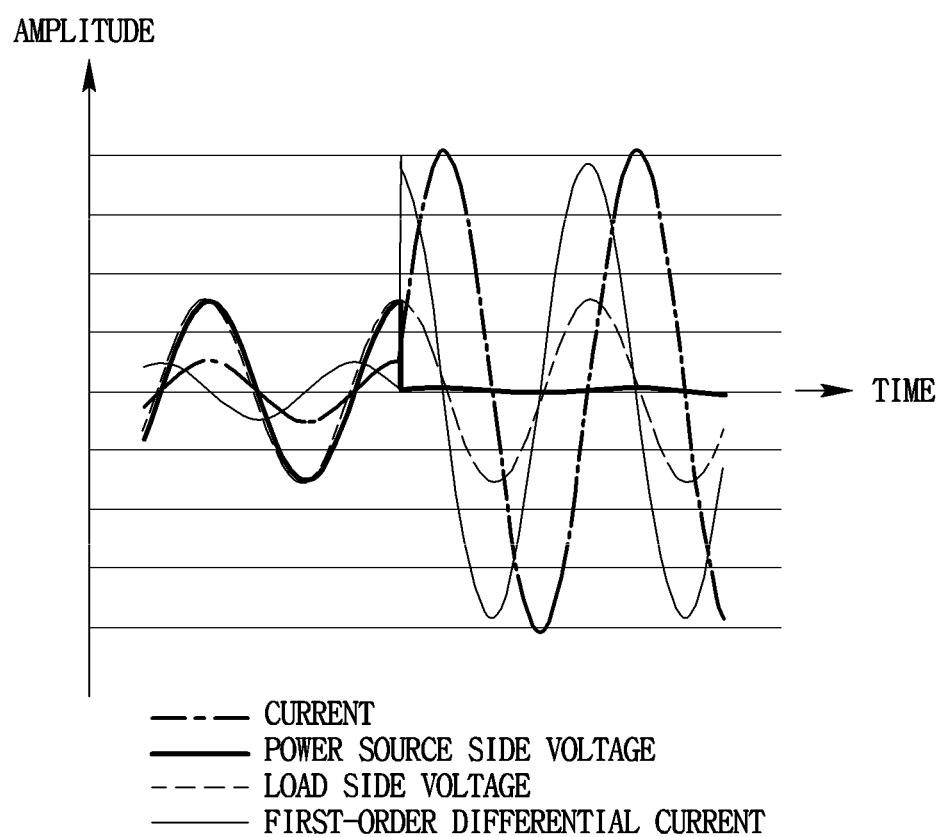
FIG. 5 is a graph showing an asymmetric sinusoidal fault current flowing when a fault occurs at a voltage of a phase of $n\pi$.

The time necessary for satisfying fault conditions can be reduced by setting the reference value for the instantaneous value i(t) of the fault current to be slightly higher than that of the normal current, and the reliability can be satisfied by setting the reference value for the first-order differential value $$\frac{di(t)}{dt}$$

of the instantaneous value i(t) as an ordinary high value. That is, as shown in FIGS. 4 and 5, the high reliability and the quick determination time can be ensured by using the characteristic of the first-order differential value $$\frac{di(t)}{dt}$$

of the instantaneous value i(t), which shows a higher value than the instantaneous value i(t) of the fault current at the moment when the fault occurs.

In a case the fault is determined using only the first-order differential value $$\frac{di(t)}{dt}$$

of the instantaneous value i(t), malfunction may occur due to an instantaneous surge. Therefore, the possibility of the malfunction is necessarily removed by applying the following condition of the logical multiply (AND) to the first-order differential value $$\frac{di(t)}{dt}$$

of the instantaneous value i(t).

$$i(t)_{first\ reference\ value} \text{ AND } \frac{di(t)}{dt_{second\ reference\ value}} \quad (a)$$

In a case the instantaneous value i(t) of the fault current is a predetermined first reference value or more, and the first-order differential value $$\frac{di(t)}{dt}$$

of the instantaneous value i(t) is a predetermined second reference value or more, it is determined that the fault has occurred.

A sufficiently quick fault determination time may be obtained using a method for determining the fault by applying conditions of the logical multiply (AND) to the instantaneous value i(t) of the fault current and the first-order differential value $$\frac{di(t)}{dt}$$

of the instantaneous value i(t). However, in a case the ratio in amplitude between the normal current and the fault current is not large and the asymmetric fault current flows, there may occur a situation that it is insufficient to determine the fault at a high speed of about 1 to 2 ms by applying the conditions of the logical multiply (AND) to the instantaneous value i(t) of the fault current and the first-order differential value $$\frac{di(t)}{dt}$$

of the instantaneous value i(t).

In order to solve such a problem that the determination of the fault becomes slow, in the present invention, there is provided a method for determining a fault by applying the conditions of the logical multiply (AND) to not only the instantaneous value i(t) of the fault current and the first-order differential value $$\frac{di(t)}{dt}$$

of the instantaneous value i(t) but also the second differential value $$\frac{di^2(t)}{dt^2}$$

of the instantaneous value i(t) as described below.

$$i(t)_{first\ reference\ value} \quad (b)$$
$$\text{AND}$$
$$\left\{ \frac{di(t)}{dt_{second\ reference\ value}} \text{ OR } \frac{di^2(t)}{dt^2_{third\ reference\ value}} \right\}$$

That is, in a case the instantaneous value i(t) of the fault current is the predetermined first reference value or more, and the second-order differential value $$\frac{di(t)}{dt}$$

of the instantaneous value i(t) is the predetermined second reference value or more, it is determined that the fault has occurred. Alternatively, in a case the instantaneous value i(t) of the fault current is the predetermined first reference value or more, and the second-order differential value $$\frac{di^2(t)}{dt^2}$$

of the instantaneous value i(t) is a predetermined third reference value or more, it is determined that the fault has occurred.

Figure 6:
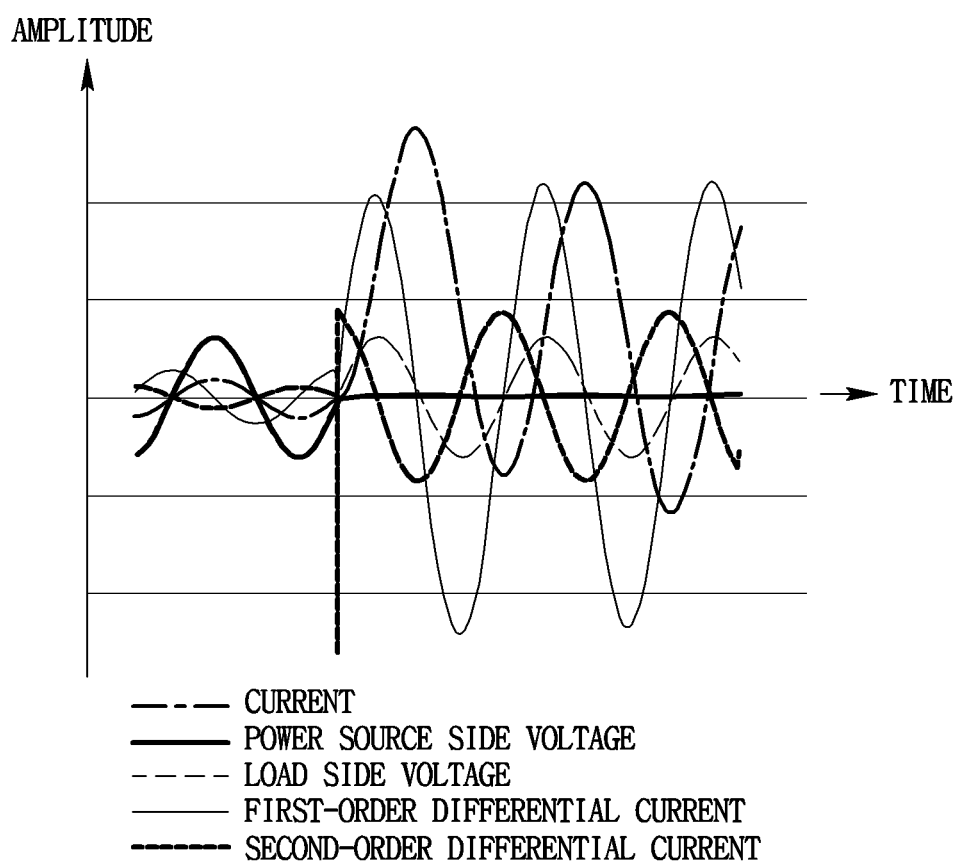
FIG. 6 is a graph showing a waveform obtained by performing a second-order differentiation of a symmetric sinusoidal fault current flowing when a fault occurs at a voltage of a phase of $n\pi/2$.
Figure 7:
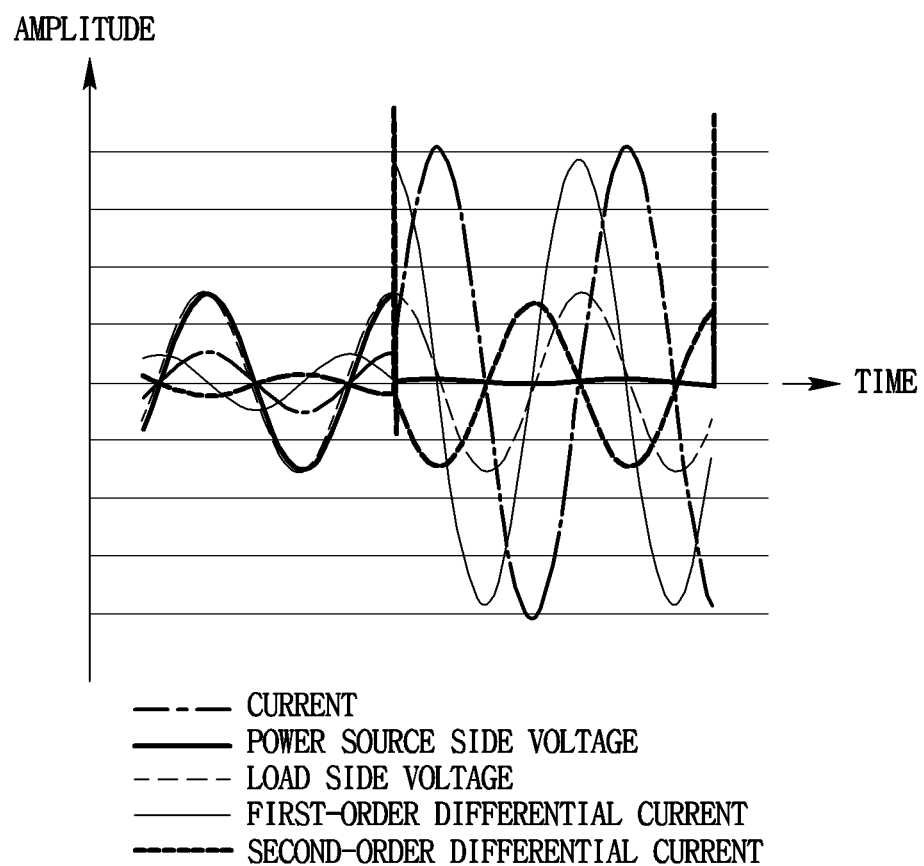
FIG. 7 is a graph showing a waveform obtained by performing a second-order differentiation of an symmetric sinusoidal fault current flowing when a fault occurs at a voltage of a phase of $n\pi$.

The second-order differential value $$\frac{di^2(t)}{dt^2}$$

of the instantaneous value i(t) contains many asymmetric components as shown in FIGS. 6 and 7, and enables the quick determination of the fault to be performed when the ratio in amplitude between the normal current and the fault current is not large.

Meanwhile, in a case an arc fault occurs, the reliability and quickness of the determination of the fault can be ensured using an optical signal together with the aforementioned conditions for the determination of the fault in a system having hardware capable of converting an optical signal of an optical sensor into an electrical signal and determining the occurrence of the fault.

In a case the optical signal is used, the occurrence of a fault is determined as follows.

$$L(t)_{fourth\ reference\ value} \quad (c)$$
$$\text{AND}$$
$$i(t)_{first\ reference\ value}$$

$$L(t)_{fourth\ reference\ value} \quad (d)$$
$$\text{AND}$$
$$i(t)_{first\ reference\ value}$$
$$\text{AND}$$
$$\frac{d\,i(t)}{d\,t_{second\ reference\ value}}$$

$$L(t)_{fourth\ reference\ value} \quad (e)$$
$$\text{AND}$$
$$i(t)_{first\ reference\ value}$$
$$\text{AND}$$
$$\left\{ \frac{d\,i(t)}{d\,t_{second\ reference\ value}} \text{ OR } \frac{d\,i^2(t)}{d\,t^2_{third\ reference\ value}} \right\}$$

That is, in (c), it is determined that the fault has occurred when the instantaneous value L(t) of the optical signal is a predetermined fourth reference value or more, and the instantaneous value i(t) of the fault current is the predetermined first reference value or more. In (d), it is determined that the fault has occurred when the instantaneous value L(t) of the optical signal is the predetermined fourth reference value or more, the instantaneous value i(t) of the fault current is the predetermined first reference value or more, and the first-order differential value $$\frac{d\,i(t)}{dt}$$

of the instantaneous value i(t) is the predetermined second reference value or more. In (e), it is determined that the fault has occurred when the instantaneous value L(t) of the optical signal is the predetermined fourth reference value or more, the instantaneous value i(t) of the fault current is the predetermined first reference value or more, and the first-order differential value $$\frac{d\,i(t)}{dt}$$

of the instantaneous value i(t) is the predetermined second reference value or more. Alternately, in (e), it is determined that the fault has occurred when the instantaneous value L(t) of the optical signal is the predetermined fourth reference value or more, the instantaneous value i(t) of the fault current is the predetermined first reference value or more, and the second-order differential value $$\frac{d\,i^2(t)}{dt^2}$$

of the instantaneous value i(t) is the predetermined third reference value or more.

In the present invention, the presence of scale of a fault at an initial time of the fault can be quickly and reliably determined using the instantaneous value of current and first- and second-order differential values of the instantaneous value. In a case there are prepared an optical sensor and a system for determining an arc fault, the quickness and reliability of the determination of the fault can be improved using an optical signal of the optical sensor as well as the instantaneous value of current and first- and second-order differential values of the instantaneous value.

Figure 8:
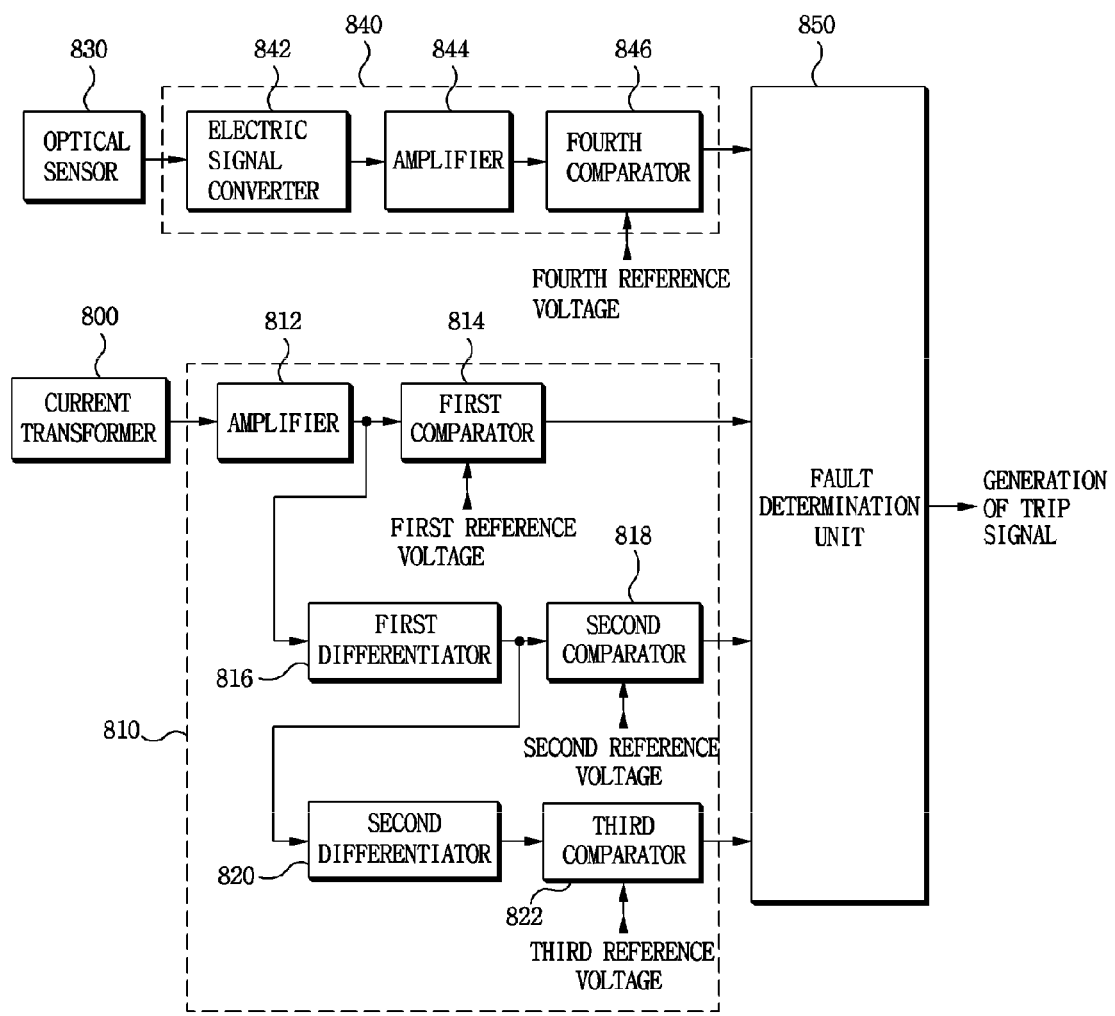
FIG. 8 is a block diagram showing a configuration of an apparatus for quickly determining a fault in an electric power system according to an embodiment of the present invention.

FIG. 8 is a block diagram showing a configuration of an apparatus for quickly determining a fault in an electric power system according to an embodiment of the present invention. Here, reference numeral 800 denotes a current transformer. The current transformer 800 is connected to a line for supplying power to a load or electric power system so as to detect, as voltage, current of the power supplied to the load or electric power system. Therefore, the first to fourth reference values may be voltage values. In the following description, the first to fourth reference values are referred to as first to fourth reference voltages, respectively.

Reference numeral 810 denotes a current determination unit. The current determination unit 810 determines whether an output signal of the current transformer 800, the first-order differential value obtained by performing a first-order differentiation of the output signal of the current transformer 800 and a second-order differential value obtained by performing a second-order differentiation of the output signal of the current transformer 800 are their predetermined reference values or more, respectively. The current determination unit 810 includes an amplifier 812, a first comparator 814, a first differentiator 816, a second comparator 818, a second differentiator 820 and a third comparator 822.

The amplifier 812 amplifies the detected voltage of the current transformer 800.

The first comparator 814 determines whether the output voltage of the amplifier 812 is a predetermined first reference voltage or more.

The first differentiator 816 performs a first-order differentiation of the output voltage of the amplifier 812.

The second comparator 818 determines whether the output voltage of the first differentiator 816 is a predetermined second reference voltage or more.

The second differentiator 820 generates a second-order differential voltage obtained by again performing a differentiation of the output voltage of the first differentiator 816.

The third comparator 822 determines whether the output voltage of the second differentiator 820 is a predetermined third reference voltage or more.

Reference numeral 830 denotes an optical sensor. The optical sensor 830 may detect light, for example, by respectively disposing a plurality of point optical sensors at a plurality of positions at which the point optical sensors are to detect occurrence of an arc fault in a relay or the like. Here, the point optical sensor detects light at a specific point.

The optical sensor 830 may be a loop optical sensor configured as an optical cable of which jacket portion is made of a transparent material. In a case intense light of an arc is incident onto the optical cable by scattering effect, the incident light penetrates into a core of the optical cable, thereby detecting the light at both ends of the cable.

Reference numeral 840 denotes an optical signal determination unit. The optical signal determination unit 840 includes an electric signal converter 842, an amplifier 844 and a fourth comparator 846.

The electric signal converter 842 converts an optical signal detected by the optical sensor 830 into an electrical signal, i.e., an optical detection voltage.

The amplifier 844 amplifies the optical detection voltage outputted by the electric signal converter 842.

The fourth comparator 846 determines whether the output voltage of the amplifier 844 is a predetermined fourth reference voltage or more.

Reference numeral 850 denotes a fault determination unit. The fault determination unit 850 determines whether a fault occurs based on output signals of the current determination unit 810 and the optical signal determination unit 840. In a case it is determined that the fault has occurred, the fault determination unit 850 generates a trip signal so as to cut off the electric power supplied to the load or electric power system.

Although it has been illustrated in FIG. 8 that the one current transformer 800 and the one current determination unit 810 are provided to the apparatus, the plurality of current transformers 800 and the plurality of current determination units 810 may be provided to the apparatus according to the number of lines for supplying electric power to the load or electric power system. For example, in a case electric power is supplied to the load or electric power system through four lines in the three-phase four-line system, the four current transformers 800 and the four current determination unit 810 may be provided to the apparatus. In a case electric power is supplied to the load or electric power system through three lines in the three-phase three-line system, the three current transformers 800 and the three current determination units 810 may be provided to the apparatus.

In FIG. 8, a case where one optical sensor 830 and one optical signal determination unit 840 are provided to the apparatus has been illustrated as an example. However, in a case a plurality of point optical sensors are used as the optical sensor 830, the plurality of point optical sensors and the plurality of optical signal determination units 840 may be provided to the apparatus.

In the apparatus of the present invention, configured as described above, in a case electric power is supplied to the load or electric power system, the current transformer 800 detects, as voltage, current of the electric power supplied to the load or electric power system.

The current detection voltage detected by the current transformer 800 is inputted to the amplifier 812 of the current detection unit 810, and the amplifier 812 amplifies the inputted current detection voltage. The current detection voltage amplified by the amplifier 812 is inputted to the first comparator 814.

Then, the first comparator 814 compares the current detection voltage inputted from the amplifier 812 with the predetermined first reference voltage, and outputs a compared result signal. That is, the first comparator 814 compares whether the output voltage of the amplifier 812 is the predetermined first reference value or more, and outputs the compared result signal.

The output voltage of the amplifier 812 is inputted to the first differentiator 816, and a first-order differentiation is performed with respect to the inputted voltage. The first-order differential voltage of the first differentiator 816 is inputted to the second comparator 818.

Then, the second comparator 818 compares the first-order differential voltage inputted from the first differentiator 816 with the predetermined second reference voltage, and outputs a compared result signal. That is, the second comparator 818 compares whether the first-order differential voltage of the first differentiator 816 is the predetermined second reference voltage or more, and outputs the compared result signal.

The second differentiator 820 generates a second-order differential voltage obtained by again performing a differentiation of the first-order differential signal of the first differentiator 816, and the generated second-order differential voltage is inputted to the third comparator 822.

Then, the third comparator 822 compares the second-order differential voltage inputted from the second differentiator 820 with the predetermined third reference voltage, and outputs a compared result signal. That is, the third comparator 822 compares whether the second-order differential voltage of the second differentiator 820 is the predetermined third reference voltage or more, and outputs the compared result signal.

In a case an arc fault occurs, the optical sensor detects light and generates an optical signal. The generated optical signal is inputted to the electric signal converter 842 of the optical signal determination unit 840, and the electric signal converter 842 converts the inputted optical signal into an electrical signal, i.e., an optical detection voltage.

The optical detection voltage converted by the electric signal converter 842 inputted to the amplifier 844, and the amplifier 844 amplifies the inputted optical detection signal. The amplified optical detection signal is inputted to the fourth comparator 846.

Then, the fourth comparator 846 compares the optical detection voltage inputted from the amplifier 844 with the predetermined fourth reference voltage, and outputs a compared result signal. That is, the fourth comparator 846 compares whether the optical detection voltage amplified by the amplifier 844 is the predetermined fourth reference voltage or more, and outputs the compared result signal.

Meanwhile, the fault determination unit 850 receives output signals respectively inputted from the current determination unit 810 and the optical signal determination unit 840, and determines whether a fault has occurred in the supply of electric power.

That is, in a case only the current transformer 800 and the current determination unit 810 are provided to the apparatus, the fault determination unit 850 determines the occurrence of the fault by applying the following logical expression.

$$i(t)_{first\ reference\ voltage}$$
$$\text{AND}$$
$$\left\{ \frac{di(t)}{dt}_{second\ reference\ voltage} \text{ OR } \frac{di^2(t)}{dt^2_{third\ reference\ voltage}} \right\}$$

That is, in a case the instantaneous value i(t) of the fault current is a predetermined first reference voltage or more, the first-order differential value $$\frac{di(t)}{dt}$$

of the instantaneous value i(t) is a predetermined second reference voltage or more, the fault determination unit 850 determines that the fault has occurred, and generates a trip signal. Alternatively, in a case the instantaneous value i(t) of the fault current is a predetermined first reference voltage or more, the second-order differential value $$\frac{d\,i^2(t)}{dt^2}$$

of the instantaneous value i(t) is a predetermined third reference voltage or more, the fault determination unit 850 determines that the fault has occurred, and generates a trip signal.

In a case the current transformer 800, the current determination unit 810, the optical sensor 830 and the optical signal determination unit 840 are all provided to the apparatus, the fault determination unit 850 receives the output signals respectively inputted from the current determination unit 810 and the optical signal determination unit 840, and determines whether the fault occurs by applying the following logical expressions.

$$L(t)_{fourth\ reference\ voltage}$$
$$\text{AND}$$
$$i(t)_{first\ reference\ voltage}$$

$$L(t)_{fourth\ reference\ voltage}$$
$$\text{AND}$$
$$i(t)_{first\ reference\ voltage}$$
$$\text{AND}$$
$$\frac{d\,i(t)}{d\,t_{second\ reference\ voltage}}$$

$$L(t)_{fourth\ reference\ voltage}$$
$$\text{AND}$$
$$i(t)_{first\ reference\ voltage}$$
$$\text{AND}$$
$$\left\{ \frac{d\,i(t)}{d\,t_{second\ reference\ voltage}} \text{ OR } \frac{d\,i^2(t)}{d\,t^2_{third\ reference\ voltage}} \right\}$$

That is, in a case the instantaneous value L(t) of the optical signal is the predetermined fourth reference voltage or more, and the instantaneous value i(t) of the fault current is the predetermined first reference voltage or more, the fault determination unit 850 determines that the fault has occurred, and generates a trip signal. In a case the instantaneous value L(t) of the optical signal is the predetermined fourth reference voltage or more, the instantaneous value i(t) of the fault current is the predetermined first reference voltage or more, and the first-order differential value $$\frac{d\,i(t)}{dt}$$

of the instantaneous value i(t) is the predetermined second reference voltage or more, the fault determination unit 850 determines that the fault has occurred, and generates a trip signal. In a case the instantaneous value L(t) of the optical signal is the predetermined fourth reference voltage or more, the instantaneous value i(t) of the fault current is the predetermined first reference voltage or more, and the first-order differential value $$\frac{d\,i(t)}{dt}$$

of the instantaneous value i(t) is the predetermined second reference voltage or more, or in a case the instantaneous value L(t) of the optical signal is the predetermined fourth reference voltage or more, the instantaneous value i(t) of the fault current is the predetermined first reference voltage or more, and the second-order differential value $$\frac{d\,i^2(t)}{dt^2}$$

of the instantaneous value i(t) is the predetermined third reference voltage or more, the fault determination unit 850 determines that the fault has occurred, and generates a trip signal.

According to the present invention, the amplitudes of fault reference voltages of an instantaneous value of a fault current, the first-order differential value and the second-order differential value are controlled using the instantaneous value of a current signal, the first-order and second-order differential values of the instantaneous value as information, so that it is possible to quickly and reliably determine the presence of occurrence of a fault.

Further, in a case there are prepared an optical sensor and a system for determination of an arc fault, the quick and reliable determination of the fault can be improved using an optical signal and the differential value of the optical signal.

According to the present invention, it is possible to develop a relay for determining occurrence of a fault at a super-high speed. That is, it is possible to develop a relay capable of determining occurrence of a fault in an electric power system or electric circuit for 0.125 cycle or less.

In the present invention, the first-order and second-order differential values of the instantaneous value of current can be obtained using a digital circuit, software method or analog circuit. Particularly, when current is measured using a Rogowski coil, the measured output is a voltage in proportion to the differential value of the current value, and thus the voltage can immediately use as the first-order differential value. However, this corresponds to an embodiment in which the algorithm of the present invention is implemented using a hardware method, and the embodiment cannot be seen as a new invention.

Although the present invention has been described in connection with the preferred embodiments, the embodiments of the present invention are only for illustrative purposes and should not be construed as limiting the scope of the present invention. It will be understood by those skilled in the art that various changes and modifications can be made thereto within the technical spirit and scope defined by the appended claims.

What is claimed is:
1. An apparatus for quickly determining a fault in an electric power system, the apparatus comprising:
   a current transformer configured to detect an instantaneous current (I(t)) supplied to the electric power system and output a current detection voltage of the detected instantaneous current;

a current determination unit configured to
  compare the current detection voltage with a predetermined first reference voltage,
  generate a first-order differential voltage obtained by performing a first-order differentiation of the current detection voltage,
  compare the first-order differential voltage with a predetermined second reference voltage,
  generate a second-order differential voltage obtained by performing a differentiation of the first-order differential voltage, and
  compare the second-order differential voltage with a predetermined third reference voltage; and
a fault determination unit configured to determine whether a fault occurs based on each of the first, second and third comparison results and to generate a trip signal upon determining that the fault has occurred.

2. The apparatus of claim 1, wherein the current determination unit comprises:
  a first comparator configured to compare the current detection voltage with the predetermined first reference voltage;
  a first differentiator configured to generate the first-order differential voltage obtained by performing a first-order differentiation of the current detection voltage;
  a second comparator configured to compare the first-order differential voltage of the first differentiator with the predetermined second reference voltage;
  a second differentiator configured to generate the second-order differential voltage obtained by performing a differentiation of the first-order differential voltage of the first differentiator; and
  a third comparator configured to compare the second-order differential voltage of the second differentiator with the predetermined third reference voltage.

3. The apparatus of claim 1, wherein, when the current detection voltage is the predetermined first reference voltage or more, and the first-order differential voltage is the predetermined second reference voltage or more, the fault determination unit determines that the fault has occurred and generates the trip signal.

4. The apparatus of claim 1, wherein, when the current detection voltage is the predetermined first reference voltage or more, and the second-order differential voltage is the predetermined third reference voltage or more, the fault determination unit determines that the fault has occurred and generates the trip signal.

5. The apparatus of claim 1, further comprising:
  an optical sensor provided to a portion at which light is generated in occurrence of an arc fault, the optical sensor detecting the light and outputting an optical signal; and
  an optical signal determination unit configured to compare an optical detection voltage, which is voltage of an electric signal generated based on the optical signal, with a predetermined fourth reference voltage and output the compared result to the fault determination unit,
  wherein the fault determination unit determines whether a fault occurs based on the compared result of the current determination unit and the optical signal determination unit, and generates the trip signal when it is determined that the fault has occurred.

6. The apparatus of claim 5, wherein the optical sensor is a plurality of point optical sensors.

7. The apparatus of claim 5, wherein the optical sensor is a loop optical sensor configured as an optical cable of which jacket portion is formed of a transparent material.

8. The apparatus of claim 5, wherein the optical signal determination unit comprises:
  an electric signal converter configured to convert the optical signal of the optical sensor into the optical detection voltage; and
  a fourth comparator configured to compare the output voltage of the electric signal converter with the predetermined fourth reference voltage.

9. The apparatus of claim 5, wherein, when the optical detection voltage is the predetermined fourth voltage or more, and the current detection voltage is the predetermined first reference voltage or more, the fault determination unit determines that the fault has occurred and generates the trip signal.

10. The apparatus of claim 5, wherein, when the optical detection voltage is the predetermined fourth voltage or more, the current detection voltage is the predetermined first reference voltage or more, and the first-order differential voltage of the current detection voltage is the predetermined second reference voltage or more, the fault determination unit determines that the fault has occurred and generates the trip signal.

11. The apparatus of claim 5, wherein, when the optical detection voltage is the predetermined fourth voltage or more, the current detection voltage is the predetermined first reference voltage or more, and the second-order differential voltage of the current detection voltage is the predetermined third reference voltage or more, the fault determination unit determines that the fault has occurred and generates the trip signal.

12. A method for quickly determining a fault in an electric power system, the method comprising the steps of:
  (a) receiving, by an apparatus, a current detection voltage, the current detection voltage being a value of a voltage of an instantaneous current ($I(t)$) supplied to the electric power system;
  (b) receiving, by the apparatus, an optical signal of an optical sensor provided to a portion at which light is generated in occurrence of an arc fault, and generating an optical detection voltage from the optical signal, the optical detection voltage being a voltage of an electric signal generated based on the optical signal;
  (c) generating, by the apparatus, a first-order differential voltage by performing a differentiation of the current detection voltage, and generating a second-order differential voltage by performing a differentiation of the first-order differential voltage;
  (d) respectively comparing, by the apparatus, the current detection voltage, the first-order differential voltage, the second-order differential voltage and the optical detection voltage with predetermined first, second, third and fourth reference voltages to generate corresponding first, second and third comparison results;
  (e) determining, by the apparatus, whether a fault occurs based on each of the first, second and third comparison results, and
  (f) generating, by the apparatus, a trip signal when the apparatus has determined that the fault has occurred.

13. The method of claim 12, wherein, when the current detection voltage is the predetermined first reference voltage or more, and the first-order differential voltage is the predetermined second reference voltage or more, or when the current detection voltage is the predetermined first reference voltage or more, and the second-order differential voltage is the predetermined third reference voltage or more, the step (e) determines that the fault has occurred and generates the trip signal.

14. The method of claim 12, wherein, when the optical detection voltage is the predetermined fourth reference voltage or more, the current detection voltage is the predetermined first reference voltage or more, and the first-order differential voltage is the predetermined second reference voltage or more, the step (e) determines that the fault has occurred and generates the trip signal.

15. The method of claim 12, wherein, when the optical detection voltage is the predetermined fourth reference voltage or more, the current detection voltage is the predetermined first reference voltage or more, and the second-order differential voltage is the predetermined third reference voltage or more, the step (e) determines that the fault has occurred and generates the trip signal.

* * * * *